(12) United States Patent
Magee

(10) Patent No.: US 12,037,130 B2
(45) Date of Patent: Jul. 16, 2024

(54) METHODS, SYSTEMS, AND APPARATUSES FOR A WIRELESS STORAGE DEVICE

(71) Applicant: FEDERAL EXPRESS CORPORATION, Memphis, TN (US)

(72) Inventor: Charles E. Magee, Cordova, TN (US)

(73) Assignee: Federal Express Corporation, Memphis, TN (US)

( * ) Notice: Subject to any disclaimer, the term of this patent is extended or adjusted under 35 U.S.C. 154(b) by 106 days.

(21) Appl. No.: 17/333,781

(22) Filed: May 28, 2021

(65) Prior Publication Data

US 2021/0371121 A1 Dec. 2, 2021

Related U.S. Application Data

(60) Provisional application No. 63/033,003, filed on Jun. 1, 2020.

(51) Int. Cl.
| | |
|---|---|
| *B64D 43/00* | (2006.01) |
| *B64D 45/00* | (2006.01) |
| *G07C 5/00* | (2006.01) |
| *G07C 5/08* | (2006.01) |
| *H04B 1/3822* | (2015.01) |

(52) U.S. Cl.
CPC ............ *B64D 43/00* (2013.01); *G07C 5/008* (2013.01); *G07C 5/085* (2013.01); *H04B 1/3822* (2013.01)

(58) Field of Classification Search
CPC ........ B64D 43/00; B64D 45/00; G07C 5/008; G07C 5/085; H04B 1/3822
USPC .......................................................... 701/23
See application file for complete search history.

(56) References Cited

U.S. PATENT DOCUMENTS

| | | | | |
|---|---|---|---|---|
| 6,943,699 | B2* | 9/2005 | Ziarno | B64D 29/00 |
| | | | | 701/14 |
| 8,744,372 | B2* | 6/2014 | Ziarno | H04L 67/12 |
| | | | | 455/66.1 |
| 9,591,171 | B2* | 3/2017 | Obradovich | G08G 1/096716 |
| 2009/0121947 | A1* | 5/2009 | Nysen | H01Q 21/24 |
| | | | | 343/702 |
| 2015/0363981 | A1* | 12/2015 | Ziarno | H04L 67/12 |
| | | | | 701/1 |
| 2016/0080073 | A1* | 3/2016 | Polehn | H04B 7/18506 |
| | | | | 455/98 |
| 2017/0086015 | A1* | 3/2017 | Elkehag | G08B 21/0291 |
| 2017/0181645 | A1* | 6/2017 | Mahalingam | G16H 10/60 |

(Continued)

*Primary Examiner* — Tyler D Paige
(74) *Attorney, Agent, or Firm* — Ballard Spahr LLP

(57) ABSTRACT

A wireless storage device for use with aircraft and other vehicles and equipment may be configured as a Personal Computing Memory Card International Association (PCMCIA) card. The wireless storage device may include a housing. The wireless storage device may also include a first interface for coupling the device to a piece of equipment. The first interface may be configured to receive data from the equipment. The wireless storage device may also include a processor and one or more memory devices positioned within the housing. The memory devices may be configured to store the data received from the equipment. The wireless storage device may also include a second interface positioned within the housing. The second interface may be configured to wirelessly transmit the data. The wireless storage device may also include an antenna coupled to an exterior of the housing. The antenna may be communicatively coupled to the second interface.

20 Claims, 8 Drawing Sheets

(56) References Cited

U.S. PATENT DOCUMENTS

2019/0371084 A1\* 12/2019 Krupa ................ H04B 7/18506
2021/0371121 A1\* 12/2021 Magee ................... B64D 43/00

\* cited by examiner

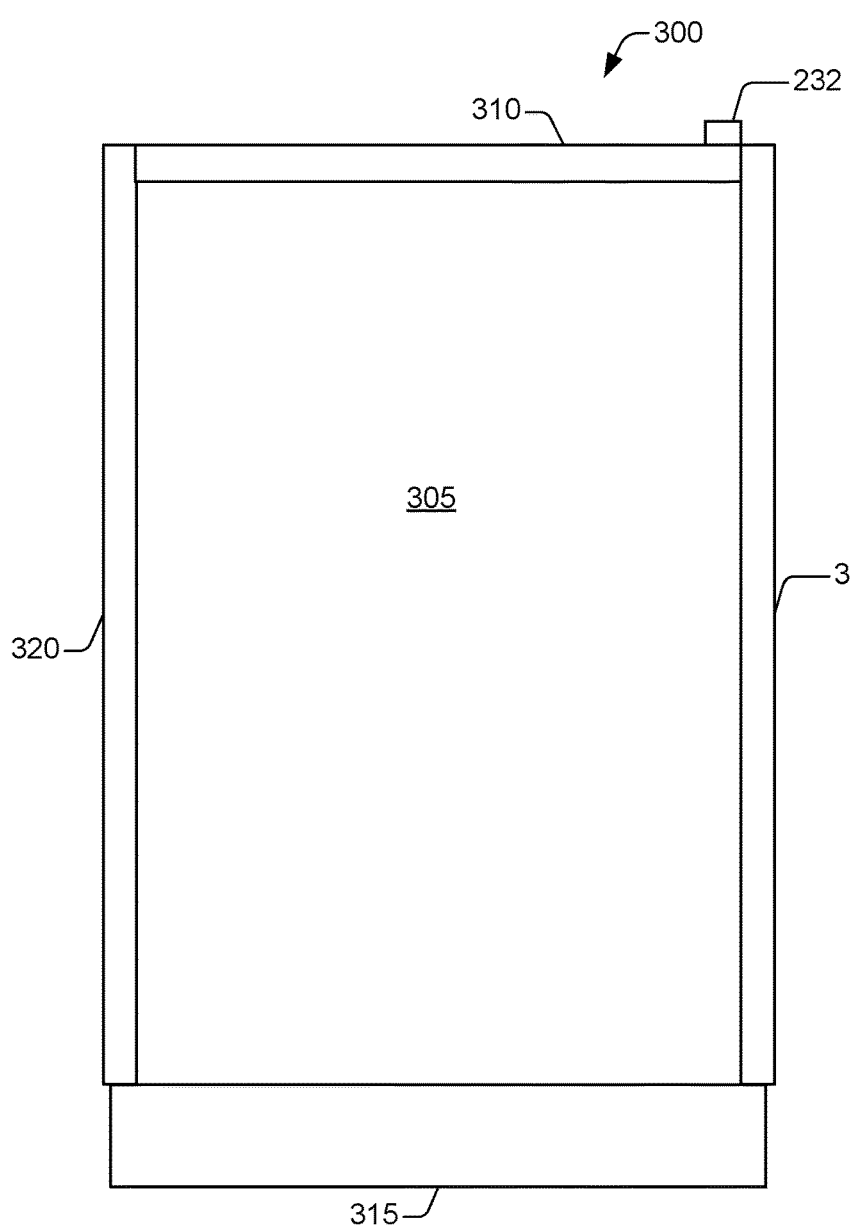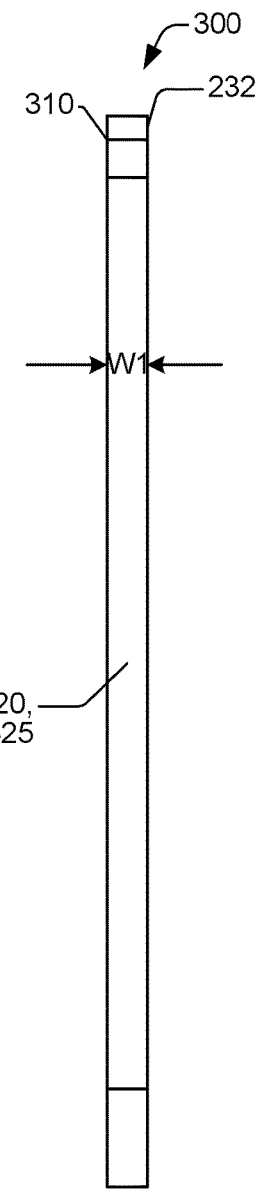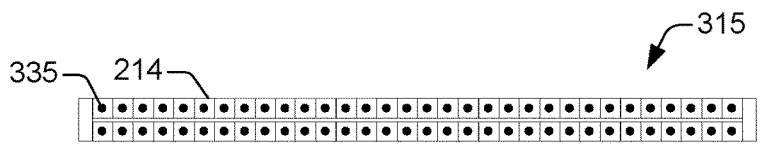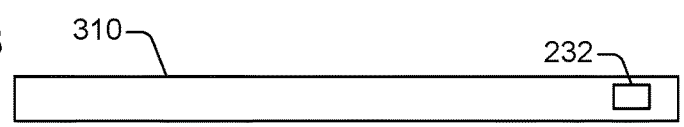
FIG. 3A
FIG. 3D
FIG. 3B
FIG. 3C

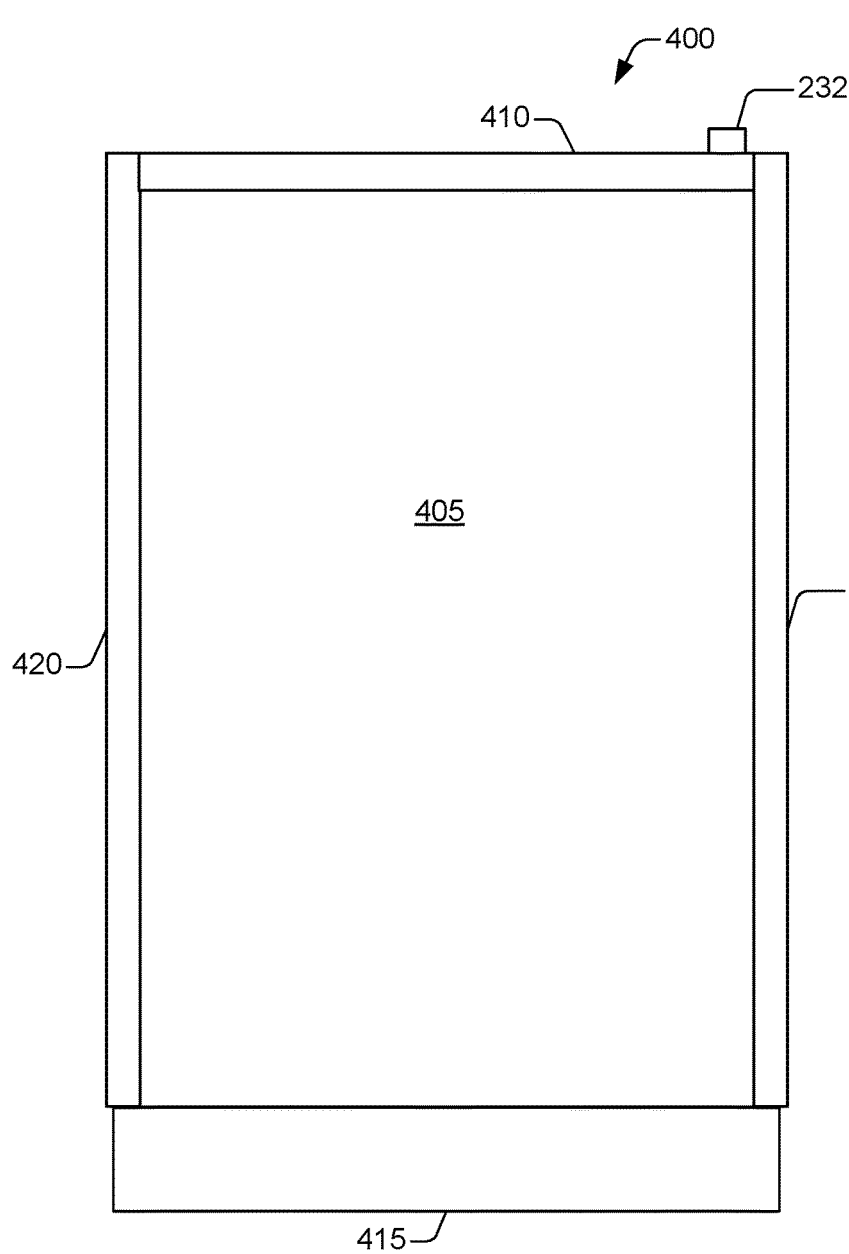
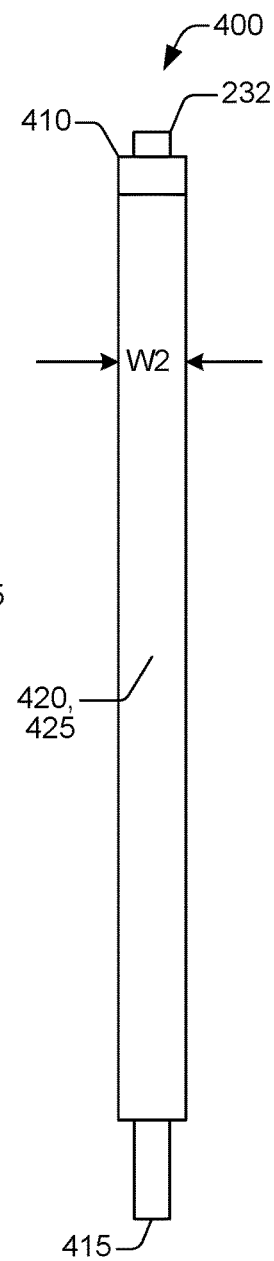
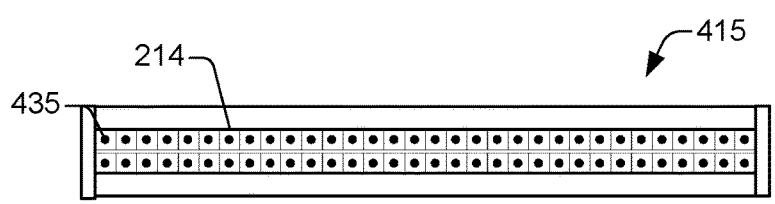
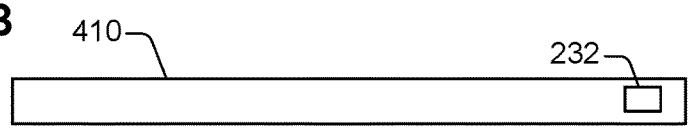
FIG. 4A
FIG. 4B
FIG. 4C
FIG. 4D

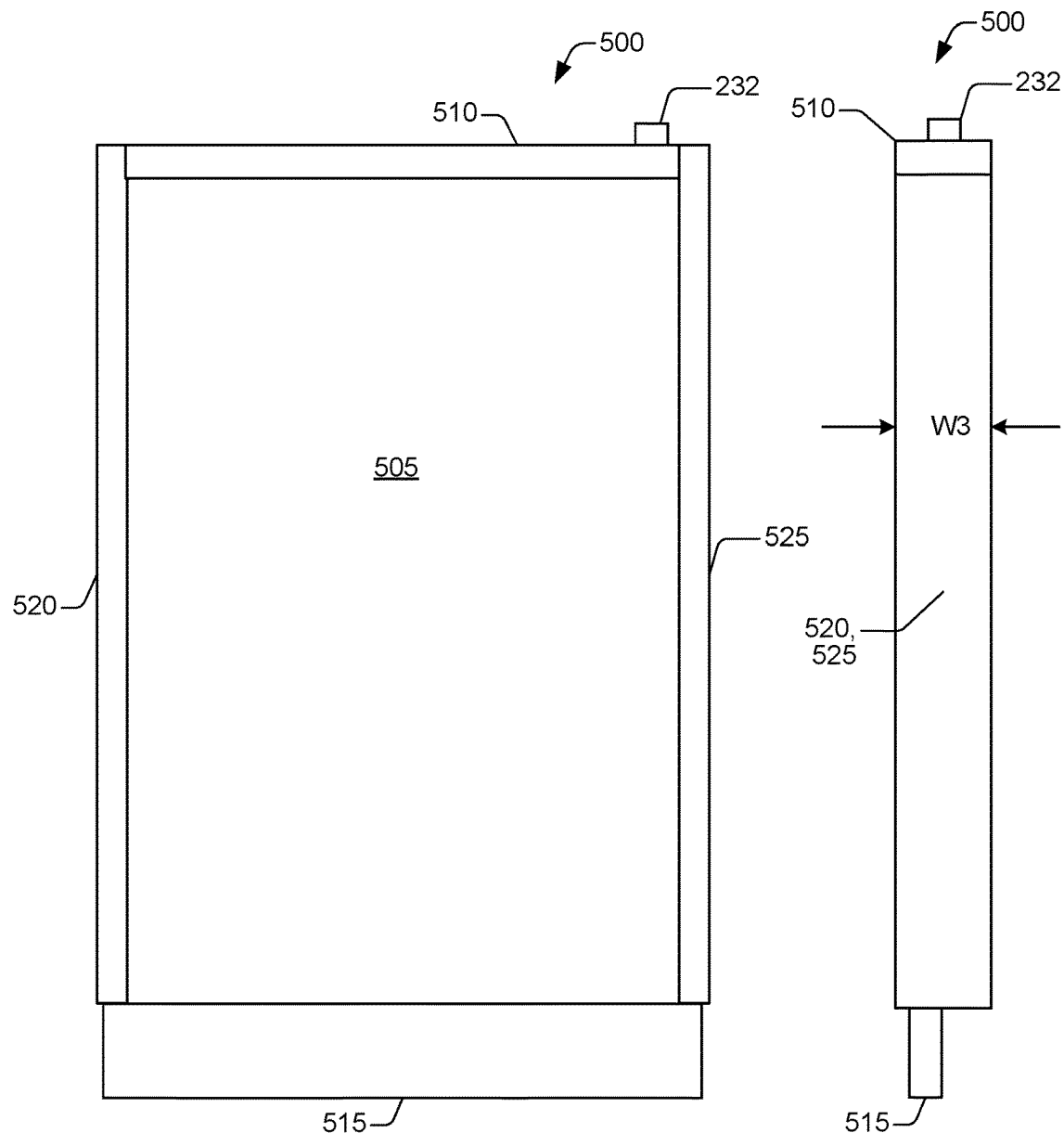
FIG. 5A
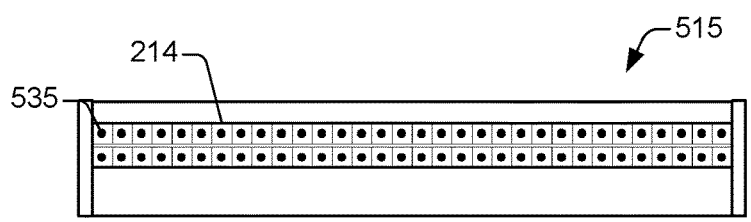
FIG. 5B
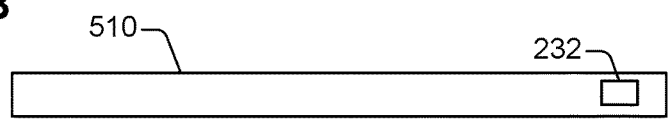
FIG. 5C
FIG. 5D

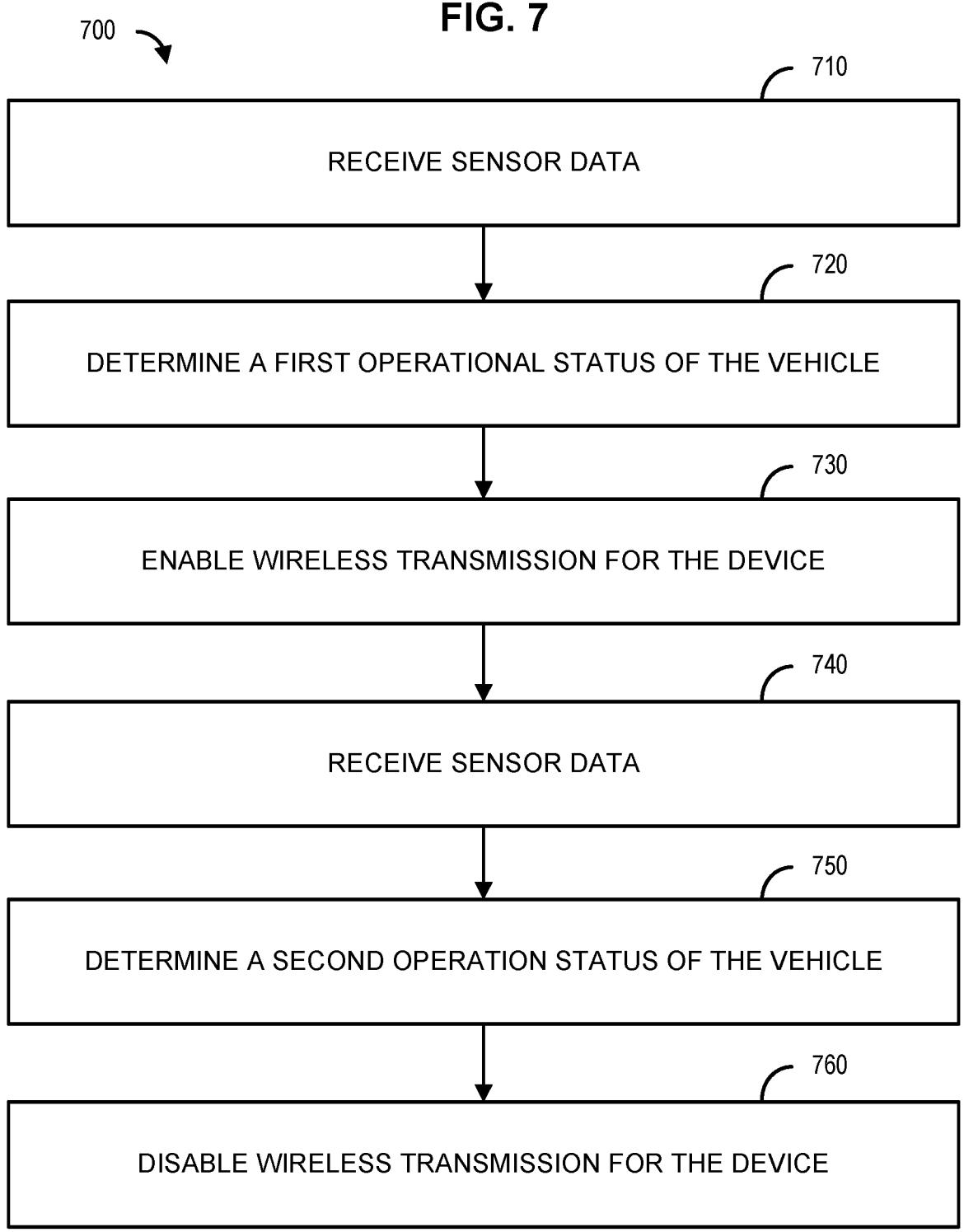

METHODS, SYSTEMS, AND APPARATUSES FOR A WIRELESS STORAGE DEVICE

CROSS REFERENCE TO RELATED PATENT APPLICATION

This application claims priority under 35 U.S.C. § 119(e) to and benefit of U.S. Provisional Patent Application No. 63/033,003, filed on Jun. 1, 2020, titled "Wireless Storage Device," the entire contents of which are hereby incorporated herein by reference for all purposes.

TECHNICAL FIELD

The disclosure relates generally to storage devices configured to be attached to equipment and, more particularly to a storage device having a wireless interface and configured to transmit data wirelessly to another device.

BACKGROUND

Operation of certain types of vehicles, machines, and/or equipment (e.g., aircraft, trains, ships, etc.) can involve large amounts of data and signaling from multiple components of the vehicle, machine, and/or equipment. For example, with regard to certain aircraft, in-flight equipment, such as a digital flight data acquisition unit (DFDAU), can collect at least some of the data and signals that are generated before, during and after a flight. Not only does the collected data represent a record of the operation of the vehicle, machine, and/or equipment, but the data also can be utilized for compliance purposes. However, in certain instances the components or data acquisition devices may be located within an area of the vehicle, machine, or equipment that is inaccessible or difficult to access even when the vehicle, machine, or equipment is not in use. For example, with regard to certain aircraft, the in-flight equipment, such as the DFDAU, can be difficult to access, involving in some cases an operator accessing a confined area in order to retrieve such data. As a result, it may difficult to efficiently obtain and evaluate the data and signals in order to resolve issues that may have occurred or may be occurring during the operation of the aircraft or other vehicle, machine, or equipment.

SUMMARY

Described herein, in various aspects, is an apparatus for wirelessly transmitting data from a piece of equipment. The apparatus may include a housing. The apparatus may also include a first interface. The first interface may be configured to be coupled to and receive data from a piece of equipment. The apparatus may also include at least one processor and at least one memory device. The processor and the memory device may be disposed in the housing. The memory device may be configured to store at least a portion of the data received from the equipment. The apparatus may also include a second interface. The second interface may be disposed within the housing and configured to wirelessly transmit at least a portion of the data received from the equipment. The apparatus may also include an antenna. The antenna may be coupled to an exterior of the housing and communicatively coupled to the second interface.

Also described herein is a PCMCIA card for wirelessly transmitting data from a piece of equipment. The PCMCIA card may include a housing. The PCMCIA card may also include a first interface. The first interface may be configured to be coupled to a piece of equipment and to receive data from the piece of equipment. The PCMCIA card may also include at least one processor and at least one memory device. The processor and the memory device may be disposed within the housing. The memory device may be configured to store at least a portion of the data received from the equipment. The PCMCIA card may also include a second interface. The second interface may be disposed within the housing and configured to wirelessly transmit at least a portion of the data received from the equipment. The PCMCIA card may also include at least one sensor disposed within the housing.

Also described herein is a method. The method may include receiving sensor data. The sensor data may be received from at least one sensor. The method may also include determining an operational status of a vehicle. The determination may be made based on the sensor data. The method may also include changing an operational status of a wireless interface in a PCMCIA card. The change of the operational status of the wireless interface may be made based on the operational status of the vehicle.

Additional features or advantages of the disclosed technologies will be set forth in part in the description which follows, and in part will be apparent from the description, or may be learned by practice of this disclosure. The advantages of the disclosure can be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the disclosure and are incorporated into the present specification. The drawings illustrate examples of certain embodiments of the disclosure and, in conjunction with the description and claims, serve to explain, at least in part, various principles, features, or aspects of the disclosure. Some example embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows.

FIGS. 3A-D illustrate an example form factor of a wireless storage device, in accordance with one or more example embodiments of this disclosure.

FIGS. 4A-D illustrate another example form factor of a wireless storage device, in accordance with one or more example embodiments of this disclosure.

FIGS. 5A-D illustrate another example form factor of a wireless storage device, in accordance with one or more example embodiments of this disclosure.

FIG. 7 is a flowchart of an example method for adjusting the operational status of the wireless storage device, in accordance with one or more example embodiments of this disclosure.

DETAILED DESCRIPTION

Figure 1:
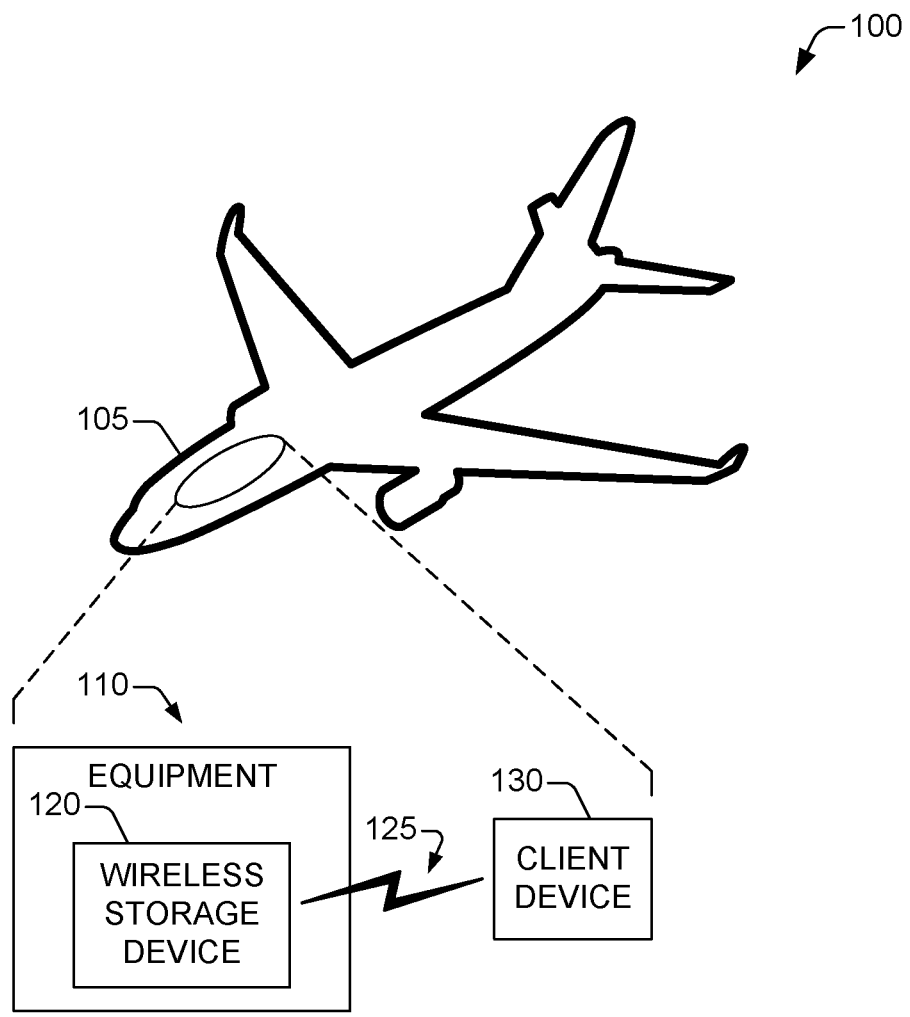
FIG. 1 illustrates an example of an operational environment for use of a wireless storage device, in accordance with one or more example embodiments of this disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described element, feature, event, or circumstance may or may not be included or occur, and that the description includes cases where said element, feature, event, or circumstance is included or occurs and cases where it is not included or does not occur.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Certain relationships between dimensions of the wireless storage device described herein and between features of the wireless storage device are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or positions indicates that the equal relationship between the dimensions or positions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially vertical" indicates that the vertical relationship of the element is not a strict limitation and does not exclude functionally similar variations therefrom. As used herein, the term "substantially horizontal" indicates that the horizontal relationship of the element is not a strict limitation and does not exclude functionally similar variations therefrom. As used herein, the term "substantially parallel" indicates that the parallel relationship is not a strict relationship and does not exclude functionally similar variations therefrom. As used herein the term "substantially level" indicates that the positional relationship is not a strict relationship and does not exclude functionally similar variations therefrom.

As used in this application, the terms "environment," "system," "module," "component," "architecture," "interface," "unit," and the like are intended to encompass an entity that includes either hardware, software, or a combination of hardware and software. Such an entity can be embodied in, or can include, for example, a signal processing device. In another example, the entity can be embodied in, or can include, an apparatus with a defined functionality provided by optical parts, mechanical parts, and/or electronic circuitry. The terms "environment," "system," "engine," "module," "component," "architecture," "interface," and "unit" can be utilized interchangeably and can be generically referred to functional elements.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, elements and features in described apparatuses and steps in described methods. Thus, if there are a variety of additional steps that may be performed or elements and features that may be included or substituted, it is understood that each of these additional steps may be performed or elements and features may be included or substituted with any specific configuration or combination of configurations of the described methods and apparatuses.

Throughout this application reference is made to block diagrams. It will be understood that each block of the block diagrams, and combinations of blocks in the block diagrams, respectively, may be implemented in a number of different ways. Accordingly, blocks of the block diagrams support one or a combinations of devices for performing the specified functions.

A component can be localized on one processing device or distributed between two or more processing devices. Components can communicate via local and/or remote architectures in accordance, for example, with a signal (either analogic or digital) having one or more data packets (e.g., data from one component interacting with another component in a local processing device, distributed processing devices, and/or across a network with other systems via the signal).

As yet another example, a component can be embodied in or can include an apparatus with a defined functionality provided by mechanical parts operated by electric or electronic circuitry that is controlled by a software application or firmware application executed by a processing device. Such a processing device can be internal or external to the apparatus and can execute at least part of the software or firmware application. Still in another example, a component can be embodied in or can include an apparatus that provides defined functionality through electronic components without mechanical parts. The electronic components can include signal processing devices to execute software or firmware that permits or otherwise facilitates, at least in part, the functionality of the electronic components. For the sake of illustration, an example of such processing device(s) includes an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed or otherwise configured (e.g., manufactured) to perform the functions described herein.

In some embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Although example embodiments of this disclosure are described with reference to certain types of aircraft, the use and applicability of the wireless storage device is not limited to aircraft. The design, capabilities, features, principles, and practical applications of the wireless storage devices disclosed herein can be used in other types of vehicles (e.g., trains, ships, trucks, construction equipment, etc.), on other types of machines, or on other types of equipment where accessibility to data storage and/or data acquisition devices is difficult, impaired, or not feasible. Accordingly, each of these other types of vehicles, machines, and equipment should be read as similarly receiving, using, and/or interacting with the wireless storage device described herein and performing the methods described herein.

FIG. 1 illustrates an example of an operational environment 100 for use of one or more wireless storage devices, in accordance with one or more example embodiments of the disclosure. With reference to FIG. 1, the operational environment 100 may include an aircraft 105 or other vehicle, machine, or equipment. In certain examples, the aircraft 105 is an airplane. Although the example of FIG. 1 depicts the aircraft 105 as an airplane, this is for example purposes only and is not limited in that respect. In other example embodiments, the aircraft 105 may be any other type of vehicle for travel through air (e.g., a helicopter, a glider, a space ship, a reusable booster for a space ship, or the like), may be another type of vehicle, may be another type of machine, or may be a type of equipment. The aircraft 105 may include a variety of types of equipment, actuators, sensors, and data recorders (referred to collectively as "equipment" 110) that may be used to operate the aircraft 105, monitor the operation of the aircraft 105, and/or monitor the environment or systems of the aircraft 105. The equipment 110 may be positioned within any portion of the aircraft 105. In certain examples, at least a portion of the equipment 110 can be located within an aircraft electronics and equipment (E&E) bay. In certain examples, one or more of the equipment is a data recording device or a data receiving device. In one example, the data receiving device may be a digital flight data acquisition unit (DFDAU).

The operational environment 100 may also include one or more wireless storage devices 120. Each wireless storage device 120 may be configured to be coupled (e.g., removably coupled or fixedly coupled) to a piece of equipment 110 within the aircraft 105. Each wireless storage device 120 may be directly or indirectly (e.g., an intermediary device or component is positioned between the equipment 110 and the device 120) to the equipment 110. For example, the wireless storage device 120 may be removably coupled to a data recording device or a data receiving device, such as the DFDAU. In other example embodiments, the wireless storage device 120 may be coupled to other equipment 110 of the aircraft 105.

The wireless storage device 120 may be coupled electrically, communicatively, and/or mechanically to the piece of equipment 110. For example, the wireless storage device 120 may include a connection interface that mechanically, electrically, and communicatively couples the wireless storage device 120 to the piece of equipment 110. In other example embodiments, the wireless storage device 120 may include separate mechanisms or interfaces for mechanically, electrically, and/or communicatively coupling the wireless storage device 120 to the piece of equipment 110. In certain examples, the equipment 110 may include a slot or cavity for receiving all or at least a portion of the wireless storage device 120 therein. The slot or cavity in the equipment 110 may include a corresponding mechanism or interface for mechanically, electrically, and/or communicatively coupling the wireless storage device 120 to the equipment 110. Thus, the wireless storage device 120 may be communicatively coupled to the equipment 110 and may be configured to receive one or more types of aircraft data and/or environmental data from the equipment 110.

The operating environment 100 may also include a client device 130. The client device 130 may be a computing device, such as a smart phone, tablet, smart television, laptop computer, desktop computer, smart watch, gaming device, or other similar computing device. In certain examples, the client device 130 may be a mobile computing device (e.g., a smart phone, tablet, laptop computer, smart watch, gaming device, or other similar mobile computing device). The client device 130 may be used, and may be configured to communicate with the wireless storage device, from anywhere inside of or outside of the aircraft 105. In certain examples, the client device 130 may be located within the cockpit area of the aircraft 105. The client device 130 may be configured to communicate wirelessly via one or more wireless communication protocols (e.g., WiFi, Bluetooth, BLE, Zigbee, Z-Wave, 6LoWPAN, etc.) with other devices. For example, the client device 130 can be communicatively coupled with the wireless storage device 120 by way of a wireless communications link 125 and may be configured to receive data (e.g., vehicle data and/or environmental data) from the wireless storage device 120 using one or more of the wireless communication protocols (e.g., WiFi, Bluetooth, BLE, Zigbee, Z-Wave, 6LoWPAN, etc.).

Figure 2A:
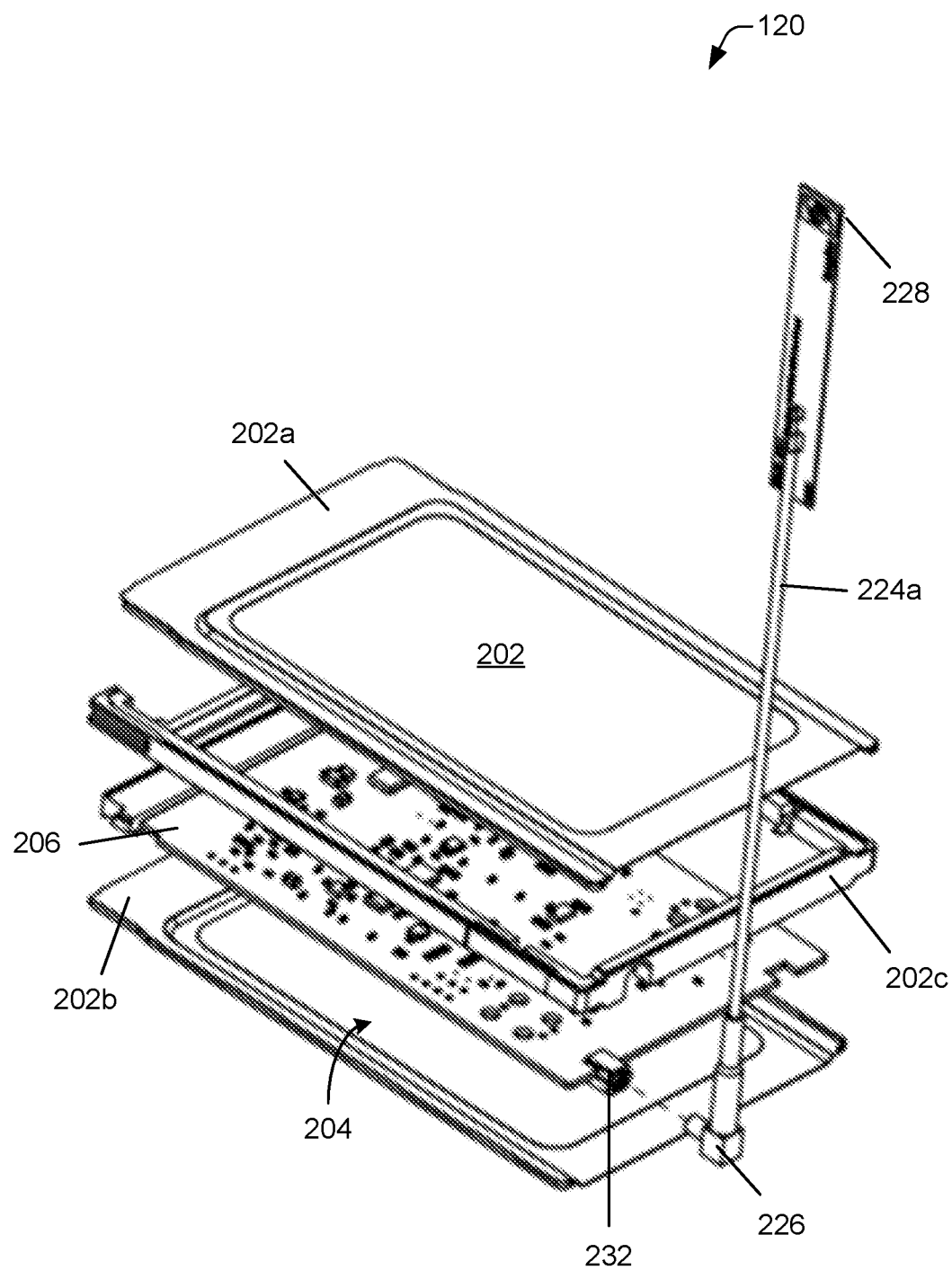
FIG. 2A illustrates an example partial-exploded view of the wireless storage device, in accordance with one or more example embodiments of the disclosure.
Figure 2B:
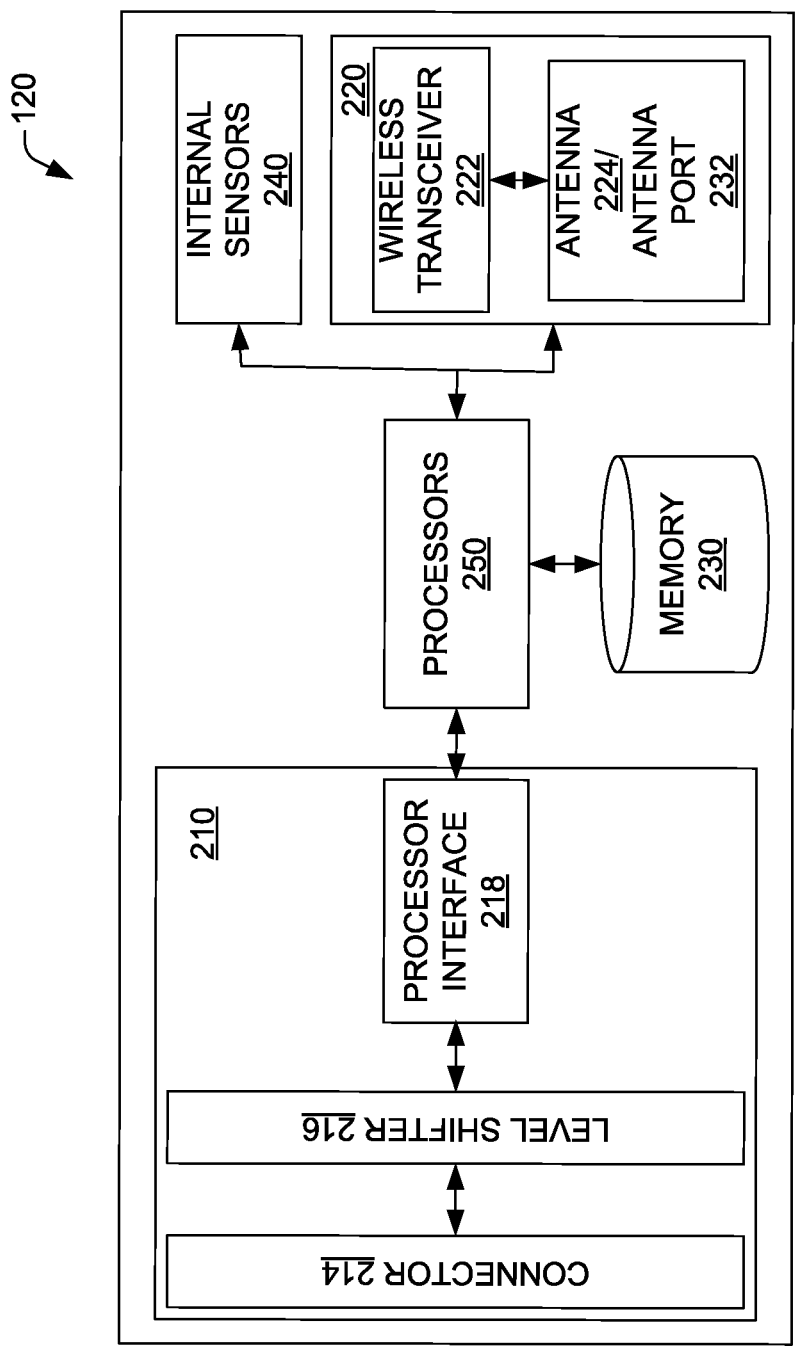
FIG. 2B illustrates a block diagram of example internal components of the wireless storage device, in accordance with one or more example embodiments of this disclosure.

FIG. 2A illustrates an example partial-exploded view of the wireless storage device 120, in accordance with one or more example embodiments of the disclosure. FIG. 2B illustrates a block diagram of example internal components of the wireless storage device 120, in accordance with one or more example embodiments of the disclosure. Referring to FIGS. 2A-B, the wireless storage device 120, may include a housing 202. The housing 202 may be configured to contain all or at least a portion of the components of the wireless storage card 120. The housing 202 may be made out of plastic, metal, ceramic, or any combination thereof. The housing 202 may define a cavity 204 within the housing 202 for positioning of one or more components of the wireless storage card 120. For example, the housing 202 may include a top housing portion 202a and a bottom housing portion 202b. Each of the top housing portion 202a and the bottom housing portion 202b may include an outer-facing surface and an inner-facing surface. The housing 202 may also include a frame portion 202c. The frame portion 202c may be positioned between the top housing portion 202a and the bottom housing portion 202b (e.g., between the inner-facing surface of the top housing portion 202a and the inner-facing surface of the bottom housing portion 202b). The top housing portion 202a may be coupled to the frame portion 202c and the bottom housing portion 202b may be coupled to the frame portion 202c. In other examples, the top housing portion 202a may be coupled directly to the bottom housing portion 202b and the frame portion 202c may be optionally eliminated.

The wireless storage card 120 may also include one or more circuit boards 206. Each circuit board of the one or more circuit boards 206 may be positioned within the cavity 204 of the wireless storage card 120. Each circuit board of the one or more circuit boards 206 may be any type of circuit board, such as a printed circuit board (PCB), a strip board, or a bread board. In examples where the circuit board 206 is a PCB, the PCB may be any type of PCB, such as a single layer PCB, a double layer PCB, a multi-layer PCB, a high density interconnect PCB, or a high frequency PCB. The circuit board 206 may have a top surface and an opposing bottom surface. The bottom surface of the circuit board 206 may be positioned adjacent and/or face the inner-facing surface of the bottom housing portion 202b and the top surface of the circuit board 206 may be positioned adjacent and/or face an inner surface of the top housing portion 202a.

The wireless storage card 120 may include a first interface 210 (e.g. a first mechanical and/or electrical coupling interface). The first interface 210 may include portions that are mechanically coupled to the one or more circuit boards 206 and other portions that are mechanically and/or electrically coupled to at least one of the one or more circuit boards 206 and positioned within the cavity 204. The first interface 210 may include a connector 214. The connector 214 may be a mechanical and/or electrical connector. In certain example embodiments, the connector 214 may be configured according to a defined standard for communication. For example, the connector 214 may be constructed according to the Personal Computer Memory Card International Association (PCMCIA) 5.0 specification. For example, the connector 214 may be a pin connector with sixty-eight pins laid out in two parallel rows of thirty-four pins. The pin connector 214 may be capable of mechanically, electrically, and communicatively coupling the wireless storage device 120 to a piece of equipment 110.

The first interface 210 may also include a level shifter component 216 and a processor interface 218. The level shifter 216 and the processor interface 218 may be mechanically and/or electrically coupled to at least one of the one or more circuit boards 206 and positioned within the cavity 204. The level shifter 216 may be configured to translate logic signals from one voltage level to another voltage level. For example, the level shifter 216 may be configured to translate logic signals between 3.3 volts (V) and 5.0V. In other example embodiments, the level shifter 216 may translate signals between other voltage levels, such as 2.5V and 1.8V.

The wireless storage device 120 may also include one or more processors 250. Each of the one or more processors 250 may be mechanically and/or electrically coupled to at least one of the one or more circuit boards 206 and positioned within the cavity 204. At least one of the one or more processors 250 may be communicatively coupled to the first interface 210. At least one of the one or more processors 250 may be embodied in processing circuitry, such as a field programmable gate array (FPGA), a complex programmable logic device (CPLD), a central processing unit (CPU), a graphics processing unit (GPU), or a combination thereof. The one or more processors 250 and the level shifter component 216 may operate and communicate according to a particular communication protocol, such as any one or more of a transmission control protocol (TCP), Internet protocol (IP), Internet protocol security (IPSec), file transfer protocol (FTP), user datagram protocol (UDP), secure sockets layer (SSL), secure shell (SSH), or any other known communications protocols.

In certain example embodiments, the first interface 210 can include a PCMCIA interface. In these examples, the wireless storage device 120 may be used in conjunction with aircraft equipment 110 (or any other vehicle, machine, or equipment) that might include a PCMCIA slot or connection interface for connecting to a PCMCIA memory card device. In these example embodiments, the wireless storage device 120 may also be retrofitted into any existing PCMCIA host device, without hardware or software modification to that host device. In addition, the wireless storage device 120 may also be used in (e.g., coupled to) legacy personal computing devices, such as a 16-bit or 32-bit personal computing device.

The wireless storage device 120 may also include a second interface 220. The second interface 220 may be communicatively coupled to the one or more processors 250 and one or more internal sensors 240 or measuring devices. In certain examples, the second interface 220 may be configured as a communications interface (e.g., a wireless communications interface). The second interface 220 may be configured to transmit or send data wirelessly to the client device 130 without a physical connection between the wireless storage card 120 and the client device 130. For example, the second interface 220 can be configured to form the wireless link 125 between the wireless storage device 120 and the client device 130. The second interface 220 can communicatively pair the wireless storage device 120 and the client device 130. The second interface 220 may include portions that are mechanically coupled to at least one of the one or more circuit boards 206 and other portions that are mechanically and/or electrically coupled to at least one of the one or more circuit boards 206 and positioned within the cavity 204.

The second interface 220 may include a wireless transceiver 222. The wireless transceiver 222 may be mechanically and/or electrically coupled to at least one of the one or more circuit boards 206 and positioned within the cavity 204. The wireless transceiver 222 may include transceiver circuitry configured to receive data wirelessly according to a wireless communications protocol and send second data wirelessly according to the wireless communications protocol.

The second interface 220 may include one or more antennas 224. In certain example embodiments, the second interface 220 may be an external antenna 224a. For example, all or at least a portion of the external antenna 224a may be positioned outside of the housing 202 of the wireless storage card. Positioning at least a portion of the external antenna 224a outside of the housing 202 may allow for improved transmission range for sending data from and receiving data to the wireless storage card 120. For example, at least a portion of the external antenna 224a, such as the antenna array, may be positioned outside of an external housing of the piece of equipment 110 when the wireless storage card 120 is attached to the piece of equipment 110. In certain examples, the external antenna 224a may include a first end 226 and a distal second end 228. The first end 226 may include a connector that is configured to be coupled to an antenna port 232 that is mechanically and/or electrically coupled to at least one of the one or more circuit boards 206 and provides a communication link between the external antenna 224a and the wireless transceiver 222. The second end 228 of the external antenna 224a may include an antenna array. In certain examples, the antenna port 232 may extend from an interior of the housing 202 (e.g., within the cavity 204) to the exterior of the housing 202. In certain examples, the antenna array may be configured to be positioned outside of a housing for the equipment 110 to improve transmission range for the wireless storage card 120.

In certain example embodiments, rather than an external antenna 224a, the wireless storage card 120 may optionally include an internal antenna 224 positioned within the housing 202 of the wireless storage card 120. The internal antenna 224 may be mechanically and/or electrically coupled to at least one of the one or more circuit boards 206 and positioned within the cavity 204. For example, the internal antenna 224 may be communicatively coupled to the wireless transceiver 222.

The wireless storage device 120 may include one or more memory devices 230. Each of the one or more memory devices 230 may be mechanically and/or electrically coupled to at least one of the one or more circuit boards 206 and positioned within the cavity 204. At least one of the one or more memory devices 230 may be communicatively coupled to at least one of the one or more processors 250. In certain example embodiments, at least one of the one or more memory devices 230 can be a solid-state non-volatile storage medium. In certain example embodiments, a command block of at least one of the one or more memory devices 230 can be available to both a host device (e.g., a PCMCIA host device) integrated into the equipment 110 and the client device 130.

In certain example embodiments, the first interface 210 (e.g., a PCMCIA interface) and the second interface 220 (e.g., a wireless interface) can have different levels of access. For example, the equipment 110 (e.g., a host device (e.g., PCMCIA host device)), to which the wireless storage card 120 is mechanically coupled, may have unrestricted access to the data retained in at least one of the one or more memory devices 230. As such, the equipment 110, or portions thereof, can read, write, and/or send specific commands to the wireless storage device 120 and at least one of the one or more memory devices 230. Accordingly, the equipment 110 can write data to at least one of the one or more memory devices 230 via the first interface 210 and at least one of the one or more processors 250. In certain examples, the equipment 110 (e.g., a PCMCIA host device) can recognize the wireless storage device 120 as a standard block storage device. In certain examples, the type of access may be similar to, or potentially the same as, a commercial off-the-shelf component.

In certain example embodiments, the second interface 220 (e.g., a wireless interface) may be prevented from having write access to at least one of the one or more memory devices 230. As such, the client device 130, being wirelessly connected to the wireless storage card 120, cannot write data (e.g., store data) into the at least one of the one or more memory devices 230 via a wireless connection through the second interface 220. However, data stored within the at least one of the one or more memory devices 230 may be downloaded via a wireless connection to the client device 130 via the second interface 220. In certain example embodiments, the access the second interface 220 has to data in at least one of the one or more memory devices 230 may be limited to one or more of: reading files, performing low-level formatting, editing wireless-specific configuration parameters (for example, SSID, WPA2 key, etc.) or editing user-configurable variables. In certain examples, wireless access (over Wi-Fi or another type of radio technology protocol) can be performed via HTTP (Hyper Text Transport Protocol) using GET commands. In certain example embodiments, the wireless storage device 120 can be configured for custom Air Transport Association (ATA) device emulation. For example, the wireless storage device 120 can receive memory read/write requests by means of the first interface 210, and can then send those requests to at least one of the one or more processors 250 instead of to the memory 230 directly.

The wireless storage device 120 may include one or more sensors 240. The one or more sensors 240 may be mechanically and/or electrically coupled to at least one of the one or more circuit boards 206 and positioned within the cavity 204. The one or more sensors 240 may be communicatively coupled to the second interface 220 and/or at least one of the one or more processors 250. The one or more sensors 240 may include one or more inertial sensors (e.g., two sensors or three sensors) that can detect one or more of movement, speed, motion changes, altitude, or altitude changes, or any combination thereof for the vehicle, machine, or equipment (e.g., the aircraft 105). The one or more sensors 240 may include barometric pressure sensors for detecting barometric pressure in the area of the equipment 110. For example, the one or more sensors 240 may generate sensor data identifying one or more motion characteristics of the wireless storage device 120. For example, the motion characteristics may include an acceleration magnitude or an acceleration direction, or both, of the wireless storage device 120. Acceleration can be angular or linear. By determining an acceleration vector, the one or more inertial sensors 240 may determine if the wireless storage device 120 is accelerating or decelerating. In a further example, the motion characteristics may include velocity magnitude or velocity direction, or both, of the wireless storage device 120. Velocity can be angular or linear. By determining a velocity vector, the one or more internal sensors 240 may determine if the wireless storage device 120 is moving and at what speed the device 120 is moving. In certain examples, the one or more internal sensors 240 may also generate sensor data identifying an altitude of the wireless storage device 120, an altitude change for the wireless storage device 120, or a barometric pressure for the wireless storage device 120. In certain examples, at least a portion of the one or more sensors 240 may be integrated into an inertial measurement unit configured to measure certain inertial changes of the equipment 110 and/or the vehicle, machine, or equipment (e.g., the aircraft 105). In certain example embodiments, the one or more sensors 240 may include two independent inertial sensors. In certain example embodiments, at least one of the one or more processors 250 may execute instructions encoded in at least one of the one or more memory devices 230 and, in response, can cause the wireless storage device to control the availability of wireless access to wireless storage device based on at least a portion of the sensor data.

In certain example embodiments, the wireless storage card 120 may optionally not include any sensors or may rely on one or more sensors outside of the wireless storage card 120, such as sensors on the equipment 110 and/or sensors or sensor data provided by the vehicle, machine, or equipment (e.g., the aircraft 105).

The wireless storage card 120 may use data from the all or a portion of the one or more sensors 240 (and/or one or more sensors external of the wireless storage card 120) to determine an operating status of the second interface 220 (e.g., the wireless interface). For example, at least one of the one or more processors 250 may receive data from one or more of the sensors 240 (and/or one or more sensors external to the wireless storage card 120) and may compare the received data to one or more thresholds. If the data satisfies the threshold and the second interface 220 is currently enabled (e.g., an on state), then the second interface 220 (e.g., the wireless transceiver 222) may be disabled (e.g., by at least one of the one or more processors 250) and prevented from transmitting data wirelessly to the client device 130 or any other device. For example, if the one or more sensors 240 detect that the equipment 110 and/or aircraft 105 is moving at a speed that satisfies the threshold (e.g., any speed above 0 miles per hour) or detects an altitude change that satisfies a threshold (e.g., 10 feet per second), or detects a barometric change that satisfies a threshold or any combination thereof, then at least one of the one or more processors 250 may disable the wireless transmitting capability of the second interface 220. If the data satisfies the threshold and the second interface 220 is currently disabled from transmitting wirelessly, then no action will be taken by the one or more processors 250 with regard to the second interface 220. If the data does not satisfy the threshold and the second interface 220 is currently enabled (e.g., an on state), then no action may be taken with regard to disabling the second interface 220. If the data does not satisfy the threshold and the second interface 220 is currently disabled, then the second interface 220 (e.g., the wireless transceiver 222) may be enabled (e.g., changed into an on state) (e.g., by at least one of the one or more processors 250) and allowed to transmit data wirelessly to the client device 130. For example, if the one or more sensors 240 detect that the equipment 110 and/or aircraft 105 is not moving at a speed that satisfies the threshold (e.g., any speed above 0 miles per hour) (or does not detect an altitude change that satisfies a threshold (e.g., 10 feet per second), or does not detect a barometric change that satisfies a threshold, or any combination thereof), then at least one of the one or more processors 250 may enable (e.g., change to an on state) the wireless transmitting capability of the second interface 220. In certain example embodiments, rather than at least one of the one or more processors 250 enabling/disabling the second interface 220, the second interface 220 can enable/disable itself in response to an evaluation of the data from the one or more sensors 240 against the one or more thresholds. The first interface 210 can remain active at all times even while the second interface 220 is disabled and can continue to receive data from the equipment 110.

In certain example embodiments, the components that constitute the wireless storage card 120 may be rated to a level of at least industrial specification. In certain example embodiments, the wireless storage device 120 can comply with at least some of the electrical and physical specifications of the PCMCIA 5.0 standard.

The wireless storage device 120 may be constructed in any shape and size desired. In certain example embodiments, the form factor or shape of the wireless storage device may satisfy the requirements of the PCMCIA 5.0 specification for a Type I PCMCIA card. FIGS. 3A-D illustrate an example wireless storage device 120 in a form factor 300 that satisfies the requirements for a PCMCIA Type I card in the PCMCIA 5.0 specification, in accordance with one or more example embodiments of this disclosure. FIG. 3A illustrates a front elevation view of the form factor 300, FIG. 3B illustrates a bottom plan view of the form factor 300, FIG. 3C illustrates a top plan view of the form factor 300, and FIG. 3D illustrates a side elevation view of the form factor 300. With reference to FIGS. 1-3D, the wireless storage device 120 in the Type I form factor 300 may include a housing 305 that defines the cavity 204. The housing 305 may include a top end 310, an opposing bottom end 315, a first lateral side 320 extending from the top end 310 to the bottom end 315, and a second lateral side 325 extending from the top end 310 to the bottom end 315. The first 320 and second 325 lateral sides may have a planar or substantially planar surface. The first 320 lateral side may be parallel or substantially parallel to the second lateral side 325. The top end 310 may extend along a plane that is parallel or substantially parallel to a plane that the bottom end 315 extends along.

The wireless storage device 120, in the form factor 300, may include an antenna port 232. In certain examples, the antenna port 232 may be positioned along the top end 310 of the housing 305. In other examples, the antenna port 232 may be positioned along another portion of the housing 305 (e.g., along the first 320 or second 325 lateral side). The antennal port 232 may extend up from the top surface of the top end 310 and/or may extend into the top surface of the top end 310 and may be configured to receive a connector for an external, removable antenna 224a.

The wireless storage device, 120 in the form factor 300, may include a connector 214. In certain examples, the connector 214 may be positioned along the bottom end 315 of the housing 305. The connector 214 may be a pin connector. For example, the connector 214 may include a plurality of pins 335 configured to mechanically, electrically, and/or communicatively couple the wireless storage device 120 to the equipment 110. In certain examples, the plurality of pins 335 is sixty eight pins 335 that are presented in two parallel or substantially parallel rows of thirty-four pins 335. The pins 335 may be constructed of a conductive material, such as metal. A substantial portion of the housing 305 of the form factor 300 has a width W1.

In certain example embodiments, the form factor or shape of the wireless storage device may satisfy the requirements of the PCMCIA 5.0 specification for a Type II PCMCIA card. FIGS. 4A-D illustrate an example wireless storage device 120 in a form factor 400 that satisfies the requirements for a PCMCIA Type II card in the PCMCIA 5.0 specification, in accordance with one or more example embodiments of this disclosure. FIG. 4A illustrates a front elevation view of the form factor 400, FIG. 4B illustrates a bottom plan view of the form factor 400, FIG. 4C illustrates a top plan view of the form factor 400, and FIG. 4D illustrates a side elevation view of the form factor 400. With reference to FIGS. 1-2B and 4A-D, the wireless storage device 120, in the Type II form factor 400, may include a housing 405 that defines the cavity 204. The housing 405 may include a top end 410, an opposing bottom end 415, a first lateral side 420 extending from the top end 410 to the bottom end 415, and a second lateral side 425 extending from the top end 410 to the bottom end 415. The first 420 and second 425 lateral sides may have a planar or substantially planar surface. The first lateral side 420 may be parallel or substantially parallel to the second lateral side 425. The top end 410 may extend along a plane that is parallel or substantially parallel to a plane that the bottom end 415 extends along.

The wireless storage device 120, in the form factor 400, may include an antenna port 232. In certain examples, the antenna port 232 may be positioned along the top end 410 of the housing 405. In other examples, the antenna port 232 may be positioned along another portion of the housing 405 (e.g., along the first 420 or second 425 lateral side). The antenna port 232 may extend up from the top surface of the top end 410 and/or may extend into the top surface of the top end 410 and may be configured to receive a connector for an external, removable antenna 224a.

The wireless storage device, 120 in the form factor 400, may include a connector 214. In certain examples, the connector 214 may be positioned along the bottom end 415 of the housing 405. The connector 214 may be a pin connector. For example, the connector 214 may include a plurality of pins 435 configured to mechanically, electrically, and/or communicatively couple the wireless storage device 120 to the equipment 110. In certain examples, the plurality of pins 435 is sixty eight pins 435 that are presented in two parallel or substantially parallel rows of thirty-four pins 435. The pins 435 may be constructed of a conductive material, such as metal. A substantial portion of the housing 405 of the form factor 400 has a width W2 that is greater than the width W1 of form factor 300 of FIGS. 3A-D.

In certain example embodiments, the form factor or shape of the wireless storage device may satisfy the requirements of the PCMCIA 5.0 specification for a Type III PCMCIA card. FIGS. 5A-D illustrate an example wireless storage device 120 in a form factor 500 that satisfies the requirements for a PCMCIA Type III card in the PCMCIA 5.0 specification, in accordance with one or more example embodiments of this disclosure. FIG. 5A illustrates a front elevation view of the form factor 500, FIG. 5B illustrates a bottom plan view of the form factor 500, FIG. 5C illustrates a top plan view of the form factor 500, and FIG. 5D illustrates a side elevation view of the form factor 500. With reference to FIGS. 1-2B and 5A-D, the wireless storage device 120, in the Type III form factor 500, may include a housing 505 that defines the cavity 204. The housing 505 may include a top end 510, an opposing bottom end 515, a first lateral side 520 extending from the top end 510 to the bottom end 515, and a second lateral side 525 extending from the top end 510 to the bottom end 515. The first 520 and second 525 lateral sides may have a planar or substantially planar surface. The first lateral side 520 may be parallel or substantially parallel to the second lateral side 525. The top end 510 may extend along a plane that is parallel or substantially parallel to a plane that the bottom end 515 extends along.

The wireless storage device 120, in the form factor 500, may include an antenna port 232. In certain examples, the antenna port 232 may be positioned along the top end 510 of the housing 505. In other examples, the antenna port 232 may be positioned along another portion of the housing 505 (e.g., along the first 520 or second 525 lateral side). The antenna port 232 may extend up from the top surface of the top end 510 and/or may extend into the top surface of the top end 510 and may be configured to receive a connector for an external, removable antenna 224a.

The wireless storage device, 120 in the form factor 500, may include a connector 214. In certain examples, the connector 214 may be positioned along the bottom end 515 of the housing 505. The connector 214 may be a pin connector. For example, the connector 214 may include a plurality of pins 535 configured to mechanically, electrically, and/or communicatively couple the wireless storage device 120 to the equipment 110. In certain examples, the plurality of pins 535 is sixty eight pins 535 that are presented in two parallel or substantially parallel rows of thirty-four pins 535. The pins 535 may be constructed of a conductive material, such as metal. A substantial portion of the housing 505 of the form factor 500 has a width W3 that is greater than the width W1 of form factor 300 of FIGS. 3A-D and greater than the width W2 of the form factor 400 of FIGS. 4A-D.

Figure 6:
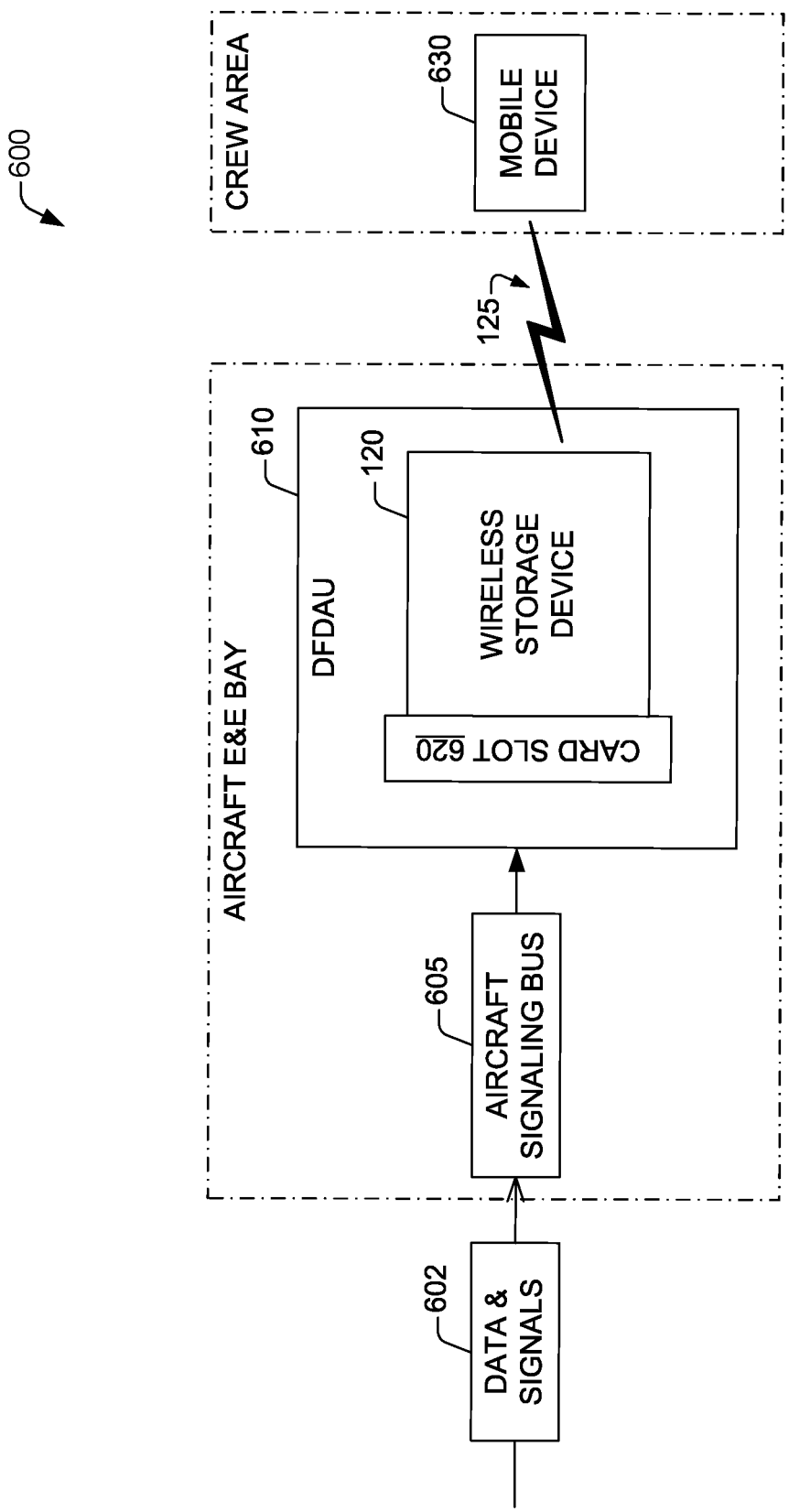
FIG. 6 illustrates an example of an operational environment for use of the wireless storage device, in accordance with one or more example embodiments of this disclosure.

FIG. 6 illustrates an example of an operational environment 600 for use of the wireless storage device 120, in accordance with one or more example embodiments of this disclosure. Referring to FIGS. 1-2B and 6, as described above, in certain example embodiments, the wireless storage device 120 may be constructed based on and have a form factor satisfying a PCMCIA Type 1, II, or III card. The wireless storage device 120 may be mechanically, electrically, and/or communicatively coupled to a digital flight data acquisition unit (DFDAU) 610 or another vehicle, machine, or piece of equipment (e.g., equipment 110). For example, the DFDAU 610 may include a card slot 620 positioned along a portion of an outer surface or casing of the DFDAU 610. The card slot 620 may be sized and shaped to receive, via slidable insertion, all or a portion of the wireless storage device 120 therein. The bottom end of the card slot 620 may include a plurality of pin-receiving apertures. Each pin receiving aperture may include a conductive pin receiver configured to receive one of the plurality of pins of the connector 214 on the bottom end of the wireless storage device 120 to generate the mechanical, electrical, and/or communicative coupling between the wireless storage device 120 and the DFDAU 610. The DFDAU 610 may be communicatively coupled to an aircraft signaling bus 605, such as an Aeronautical Radio Inc. 429 digital information transfer system. In certain example embodiments, the aircraft signaling bus 605 may be configured to receive aircraft or other vehicle, machine, or equipment data and signals 602. The data and signals 602 may be generated by any one of a number of vehicle, components, such as devices, sensors, equipment, or a combination thereof. The aircraft signaling bus 605 can act as an intermediary and transmit the or otherwise send the data and signals 602 to the DFDAU 610.

In certain example embodiments, when connected to the DFDAU, 610, the wireless storage device 120 can operate as an access point device. For example, the wireless storage device 120 can communicate wirelessly (e.g., WiFi, Bluetooth, BLE, Zigbee, Z-Wave, 6LoWPAN, etc.), via the wireless communications link 125, with a mobile device 630 (e.g., a computing device, such as a smart phone, tablet, smart television, laptop computer, smart watch, gaming device, or other similar computing device). In this manner, the wireless storage device 120 may be configured to wirelessly transmit data received from the DFDAU 610 or other equipment 110 to the mobile device 630. In certain example embodiments, the DFDAU can be located within the electronic equipment bay (E&E bay) of the aircraft 105. Further, the mobile device 630 may be located within a crew area of the aircraft 105, such as the cockpit, or may be located outside of the aircraft 105, such as on the tarmac of and airfield/airport, or located within another area configured for retrieving the data wirelessly from the aircraft 105.

FIG. 7 is a flowchart of an example method 700 for adjusting the operational status of the wireless storage device 120, in accordance with one or more example embodiments of this disclosure. Referring to FIGS. 1-7, at block 710, the wireless storage device 120 may receive sensor data. For example, the senor data may be one or more of inertial sensor data (for detecting one or more of the movement, speed, motion changes, altitude, or altitude changes of the vehicle 105 or barometric pressure data. For example, the sensor data may be received from one or more internal sensors within the wireless storage device. In other examples, the sensor data may be received from one or more sensors of the equipment 110 or another portion of the vehicle, machine, or equipment. The sensor data may be received by at least one processor of the one or more processors 250 or the second interface 220.

At 720, the wireless storage device 120 may determine a first operational status of the aircraft 105 or other vehicle, machine, or equipment. For example, the determination of the first operational status of the aircraft 105 may be based on one or more of the received sensor data from the internal sensors 240 or other sensors. The determination may be made by at least one of the one or more processors 250 or the second interface 220 of the wireless storage device 120. For example, the operational status of the aircraft 105 may be whether the aircraft 105 is moving or not, or whether the aircraft 105 is flying or not. In certain examples, the operational status of the vehicle 105 may be determined by comparing the received sensor data to one or more thresholds to determine if the sensor data satisfies the threshold. For example, if the sensor data satisfies the threshold, then the operational status of the vehicle may be moving or flying and if the sensor data does not satisfy the threshold, then the status of the vehicle may be not moving or not flying. In certain examples, the second interface 220 (e.g., the wireless interface) may be configured to be disabled (e.g., prevented from transmitting data wirelessly from the wireless storage device 120) any time the vehicle 105 or other machine or equipment is moving or flying and configured to be enabled (e.g., in an on state) (i.e., able to transmit data wirelessly from the wireless storage device 120) any time the vehicle 105 or other machine or equipment is not moving or not flying. In certain examples, the determined first operational status is that the aircraft 105, or other vehicle, machine, or equipment, is not moving, not flying, and/or not in use.

At 730, the second interface 220 may be enabled (e.g., in an on state). For example, the wireless transceiver 222 of the second interface 220 may be enabled by at least one of the one or more processors 250 or the second interface 220 to transmit data wirelessly via an internal 224 or external 224a antenna to a device 130 remote from the area of the wireless storage device 120. For example, if the sensor data does not satisfy the threshold and the second interface 220 is currently enabled (e.g., in an on state), then no action may be taken with regard to enabling the second interface 220 as the second interface 220 is already in the enabled (e.g., on) state. If the sensor data does not satisfy the threshold and the second interface 220 is currently disabled, then the second interface 220 (e.g., the wireless transceiver 222) may be enabled (e.g., in an on state) (e.g., by at least one of the one or more processors 250 or the second interface 220) and allowed to transmit data wirelessly to the client device 130. For example, if the one or more sensors 240 detect that the equipment 110 and/or aircraft 105 is not moving at a speed that satisfies the threshold (e.g., any speed above 0 miles per hour) (or does not detect an altitude change that satisfies a threshold (e.g., 10 feet per second), or does not detect a barometric change that satisfies a threshold, or any combination thereof), then at least one of the one or more processors 250 or the second interface 220 may enable the wireless transmitting capability of the second interface 220.

At 740, the wireless storage device 120 may receive additional sensor data. For example, the senor data may be one or more of inertial sensor data (for detecting one or more of the movement, speed, motion changes, altitude, or altitude changes of the vehicle 105 or barometric pressure data. For example, the sensor data may be received from one or more internal sensors 240 within the wireless storage device 120. In other examples, the sensor data may be received from one or more sensors of the equipment 110 or another portion of the vehicle, machine, or equipment external to the wireless storage device 120. The sensor data may be received by at least one processor of the one or more processors 250 or the second interface 220.

At 750, the wireless storage device 120 may determine a second operational status of the aircraft 105 or other vehicle, machine, or equipment. For example, the determination of the second operational status of the aircraft 105 may be based on one or more of the received additional sensor data from the internal sensors 240 or other sensors. The determination may be made by at least one of the one or more processors 250 or the second interface 220 of the wireless storage device 120. For example, the second operational status of the aircraft 105, like the first operational status, may be whether the aircraft 105 is moving or not, or whether the aircraft 105 is flying or not. In certain examples, the determined second operational status is that the aircraft 105, or other vehicle, machine, or equipment, is moving, flying, and/or in use. In certain examples, the second interface 220 (e.g., the wireless interface) may be configured to be disabled (i.e., prevented from transmitting data wirelessly from the wireless storage device 120) any time the vehicle 105 or other machine or equipment is moving or flying and configured to be enabled (e.g., in an on state)(i.e., able to transmit data wirelessly from the wireless storage device 120) any time the vehicle 105 or other machine or equipment is not moving or not flying.

At 760, the second interface 220 may be disabled (e.g., in an off state or low-power mode). For example, the wireless transceiver 222 of the second interface 220 may be disabled by at least one of the one or more processors 250 or the second interface 220 to prevent wireless transmission of the data received from the equipment 110 to a device 130 remote from the area of the wireless storage device 120. For example, if the sensor data satisfies the threshold and the second interface 220 is currently enabled (e.g., in an on state) (i.e. able to wirelessly transmit data), then the second interface 220 (e.g., the wireless transceiver 222) may be disabled (e.g., in an off state or low-power mode) (e.g., by at least one of the one or more processors 250 or the second interface 220) and prevented from transmitting data wirelessly to the client device 130 or any other device. For example, if the one or more sensors 240 detect that the equipment 110 and/or aircraft 105 is moving at a speed that satisfies the threshold (e.g., any speed above 0 miles per hour) (or detects an altitude change that satisfies a threshold (e.g., 10 feet per second), or detects a barometric change that satisfies a threshold or any combination thereof), then at least one of the one or more processors 250 or the second interface 220 may disable (e.g., in an off state or low-power mode) the wireless transmission capability of the second interface 220. If the sensor data satisfies the threshold and the second interface 220 is currently disabled from transmitting data wirelessly, then no action will be taken by the one or more processors 250 or the second interface with regard to the second interface 220.

The flowchart and block diagrams in the figures illustrate the architecture, functionality, and operation of possible implementations of examples of systems, methods, and computer program products according to various embodiments of the present disclosure. In this regard, each block in the flowchart or block diagrams may represent a module, segment, or portion of instructions, which includes one or more machine-executable or computer-executable instructions for implementing the specified operations. It is noted that each block of the block diagrams and/or flowchart illustration, and combinations of blocks in the block diagrams and/or flowchart illustration, can be implemented by special purpose hardware-based devices that perform the specified functions or operations or carry out combinations of special purpose hardware and computer instructions.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. An apparatus comprising:
   a Personal Computing Memory Card International Association (PCMCIA) card comprising:
      a housing;
      a first interface configured to be coupled to and receive data from a piece of equipment;
      at least one processor disposed in the housing;
      at least one memory device disposed in the housing and configured to store at least a portion of the data;
      at least one sensor disposed in the housing and configured to generate sensor data;
      a second interface disposed in the housing and configured to wirelessly transmit, based on the sensor data, the at least the portion of the data; and
      an antenna coupled to an exterior of the housing and communicatively coupled to the second interface.

2. The apparatus of claim 1, wherein the antenna is removably coupled to the exterior of the housing.

3. The apparatus of claim 1, further comprising at least one second sensor disposed in the housing.

4. The apparatus of claim 3, wherein the at least one sensor comprises at least one of an inertial sensor or a barometric pressure sensor.

5. The apparatus of claim 1, further comprising:
   an antenna port positioned along an exterior of the housing; and
   an external antenna coupled to the antenna port.

6. The apparatus of claim 1, wherein the first interface comprises a pin connector.

7. The apparatus of claim 1, wherein the housing comprises the PCMCIA card.

8. The apparatus of claim 1, wherein the PCMCIA card is configured as one of a Type I card, a Type II card, or a Type III card according to the PCMCIA 5.0 specification.

9. The apparatus of claim 1, wherein a first portion of the first interface is disposed outside of the housing and a second portion of the first interface is disposed within the housing.

10. An apparatus comprising:
    a Personal Computing Memory Card International Association (PCMCIA) card comprising:
       a housing;
       a first interface configured to be coupled to and receive data from a piece of equipment;
       at least one processor disposed in the housing;
       at least one memory device disposed in the housing and configured to store at least a portion of the data;
       a second interface disposed in the housing and configured to wirelessly transmit the at least the portion of the data; and
       at least one sensor disposed in the housing.

11. The PCMCIA card of claim 10, further comprising an antenna coupled to the housing, wherein the antenna is disposed outside of the housing.

12. The PCMCIA card of claim 10, wherein the at least one sensor comprises at least one of an inertial sensor and a barometric pressure sensor.

13. The PCMCIA card of claim 10, wherein the first interface comprises a PCMCIA connector.

14. The PCMCIA card of claim 10, wherein the second interface comprises a wireless transceiver.

15. The PCMCIA card of claim 10, wherein the second interface comprises an antenna disposed in the housing.

16. The PCMCIA card of claim 10, wherein the at least one sensor is communicatively coupled to at least one of the second interface and the at least one processor.

17. A method comprising:
    receiving, from at least one sensor, sensor data;
    determining, based on the sensor data, an operational status of a vehicle; and
    changing, based on the operational status of the vehicle, an operational status of a wireless interface in a Personal Computing Memory Card International Association (PCMCIA) card.

18. The method of claim 17, wherein determining the operational status of the vehicle comprises comparing at least a portion of the sensor data to at least one threshold.

19. The method of claim 17, wherein the operational status of the vehicle is not moving and wherein changing the operational status of the wireless interface in the PCMCIA card comprises enabling wireless transmission by the wireless interface.

20. The method of claim 17, wherein the operational status of the vehicle is moving and wherein changing the operational status of the wireless interface in the PCMCIA card comprises disabling wireless transmission capability of the wireless interface.

* * * * *